United States Patent [19]

Löffelhardt

[11] 4,002,026
[45] Jan. 11, 1977

[54] DEVICE FOR THE AFTER-BURNING OF EXHAUST GASES

[75] Inventor: Dietmar Löffelhardt, Fellbach, Germany

[73] Assignee: J. Eberspacher, Germany

[22] Filed: Oct. 15, 1974

[21] Appl. No.: 514,466

[30] Foreign Application Priority Data

Oct. 17, 1973 Germany .......................... 2351979

[52] U.S. Cl. .................................. 60/282; 60/302; 60/322; 60/323; 60/301; 60/305; 23/277 C; 23/288 FC

[51] Int. Cl.² .......................................... F01N 1/15

[58] Field of Search ............ 60/282, 302, 322, 323, 60/305, 301; 23/277 C, 288 F

[56] References Cited

UNITED STATES PATENTS

| | | | |
|---|---|---|---|
| 1,793,813 | 2/1931 | MacKinnon | 60/302 |
| 2,217,241 | 10/1940 | Tendler | 60/305 |
| 2,288,943 | 7/1942 | Eastman | 60/299 |
| 3,247,666 | 4/1966 | Behrens | 60/305 |
| 3,302,394 | 2/1967 | Pahnke | 60/282 |
| 3,633,368 | 1/1972 | Rosenlund | 60/282 |
| 3,635,031 | 1/1972 | Haddad | 60/282 |
| 3,773,894 | 11/1973 | Bernstein | 60/301 |
| 3,775,979 | 12/1973 | Scheitlin | 60/322 |
| 3,864,909 | 2/1974 | Kern | 60/322 |

*Primary Examiner*—Douglas Hart
*Attorney, Agent, or Firm*—McGlew and Tuttle

[57] ABSTRACT

A device for the after-burning of combustible components of engine exhaust gases, particularly for mounting on an engine block of an Otto engine, comprises a reactor housing which has an interior elongated reaction chamber. The reaction chamber is divided by a perforated bottom plate which extends across the reaction chamber and divides it into first and second chamber portions. An exhaust gas conduit is connected into the first chamber portion along with a secondary combustion air supply conduit, and the second chamber portion is connected to a treated gas discharge conduit for conducting away from the gases. The exhaust gas conduit is made very short and it has a flange thereon for mounting the device directly on the combustion engine block. The plate is perforated, and it includes one or more plate portions which permits the portions to be displaced relatively in order to accommodate any thermal expansion and contraction. In a similar manner, the housing itself is made of an inner shell portion, having parts which are relatively movable, and which is covered by an outer shell with insulation disposed therebetween.

10 Claims, 3 Drawing Figures

DEVICE FOR THE AFTER-BURNING OF EXHAUST GASES

FIELD AND BACKGROUND OF THE INVENTION

This invention relates in general to the construction of exhaust gas treating devices and, in particular, to a new and useful device for the after-burning of combustible components of engine exhaust gases which may be easily mounted on the engine block.

DESCRIPTION OF THE PRIOR ART

The present invention is particularly applicable to devices for effecting an after-burning of the exhaust gases by adding additional or secondary combustion air thereto in a separate reaction chamber. Devices of this nature are used principally for removing noxious substances from automotive engine exhausts. To this end, generally two processes may be used, namely, a purification by means of catalysts, and an after combustion of the exhaust gases. The two processes are frequently used in combination. In the purification by means of catalysts, the exhaust gas is supplied to a catalyst located in a housing in the exhaust gas conduit and the catalyst is designed as a monolithic honeycomb structure. The catalyst must be mounted at a location of the exhaust system where the temperature has a predetermined value which is necessary for the effectiveness of the catalyst. A drawback of the catalytic purification is that the pulsation of the exhaust gases tend to cause a destruction of the monolithic honeycomb carrying the catalyst. In consequence, it is frequently impossible to obtain the required operational treatment times.

The post-combustion process is simpler and easier to control than the catalytic process. In such a process, the exhaust gases leaving the outlet valve of the engine is supplied to a reactor. Secondary combustion air is added to prepare the exhaust gases for the post-combustion. The combustible components of the exhaust gases are therefore burned in the reactor, wherein, the ignitable mixture is ignited either by the additional igniting device or by the high temperature of the exhaust gases themselves. The igniting device may usually be switched off after the engine is put into operation because, at that time, the reactor is heated to red heat which is a temperature sufficient for the ignition.

Combinations of the two purification processes are also well-known. In devices suitable for this purpose, the unit for catalytic purification by means of a monolithic honeycomb body is mounted after the reactor. Such an arrangement, however, is quite expensive and is difficult to coordinate from the standpoint of operating temperatures.

SUMMARY OF THE INVENTION

In accordance with the invention, there is provided a device for after-burning exhaust gases which works with a very high efficiency and provides a means for ensuring a maximum amount of burning of the combustible components of the exhaust gases. The reactor includes an elongated reaction space in which at least one perforated bottom plate is mounted so as to divide the space into first and second reaction chamber portions. The exhaust gas is supplied through a conduit into the first chamber portion and this conduit is made as short as possible and is provided with a flange so it may be mounted directly to the cylinder block of the engine. The perforated bottom plate dividing the reaction space ensures an extension of the period of dwell of the exhaust gases in each first and second chamber portions and thus contributes to a substantial improvement of the combustion. In addition, the perforation has the effect of rendering the outflow of the exhaust gases more uniform. Such an effect is also utilized in the design of sound absorbers and it leads to a muffling of the exhaust gas noises. In the case of the sound damping, however, the construction must be somewhat different.

Because of the high temperatures which are produced in the reaction space during the post-combustion, the invention provides means for insuring that the parts therein do not expand to a point at which they become inoperative. For this purpose, the bottom plate is made of a plurality of parts which are mounted so that they may be moved relatively to each other and, in addition, the reaction space is enclosed by an inner shell with parts which are relatively movable. The entire chamber is also insulated by an outer covering of insulation and an outer shell which covers the insulation. The construction is such that the walls bounding the reaction space, as well as the bottom dividing plate, may all move relatively under thermal load, so that no stresses will occur. The service life of the device is thereby vastly extended. The construction is such that the high operating temperatures will not be communicated to the exterior in the vicinity of the engine where they are likely to pose a danger in respect to escaping gasoline or similar inflammable substances. For this reason, the reaction space is surrounded by a heat insulation layer which is in turn enclosed by an outer jacket formed of two half shells which are advantageously welded together.

Secondary combustion air is supplied to the reaction zone by a conduit which extends along the exterior wall of the reactor, for example, the top and which includes branch conduits which lead the combustion air into the space directly above the outlet valves of the engine so that the air can be directly furnished at locations where the exhaust gases have very high temperatures. With this arrangement, the device may be made more compact and the combustion air preheated in its movement to the reaction zone. In the preferred form, the branch conduits for supplying the combustion air are directed through a portion of the exhaust gas conduits which connect into the first chamber portion of the reactor chamber.

In still another arrangement of the invention, a foil is located between the individual parts forming the reaction space and the heat insulation layer and it is located at least at a location where the individual parts of the reaction space wall overlap or at locations where frictional movement is adapted to take place. This frictional movement between the parts is due to the expansion of the walls in the reaction zone so that friction is produced in the heat insulation layer surrounding the space at locations where the insulation layer applies to the parts of the reaction space coating. In such frictional heating, there is a tendency for the insulation layer to loosen or crumble away, but the foil prevents such an occurrence. In order to stiffen the perforated bottom plate which divides the reaction space, a further development of the invention provides that the perforated bottom plate is formed with stiffening impressions. Such a stiffening may also be obtained by providing the bottom plate with ribs. These measures are of importance because, otherwise, deformations may occur at high temperatures. In order to cope with the thermal stresses in the bottom plate and the length variations resulting therefrom, there is provided in accordance with a further development of the invention, a bottom plate which is constructed of a plurality of lengths divided longitudinally, with at least one of the parts being offset from the other, so that the parts overlap and slide relatively so that they may be movable relatively to compensate for thermal stresses.

In a further advantage of the invention, the bottom plate is covered with a metal layer in the reaction chamber and this acts as a catalyst. Such metals as copper and nickel, either individually or in alloys, have proved to be particularly suitable catalytic materials. Such a use of the bottom plate as a catalytic agent makes it possible to further improve the purification of the exhaust gases.

Accordingly, it is an object of the invention to provide an improved device for the after-burning of combustible components of engine exhaust gases, particularly a device which is adapted to be mounted on an engine block of an Otto cycle engine, which comprises a housing having an interior elongated reaction chamber which is divided into first and second chamber portions by a bottom plate which is advantageously made up of relatively movable parts to accommodate thermal expansion and which is perforated, so that the reaction gases may move from a first portion into a second reaction chamber portion and be discharged out through a discharge conduit and wherein, the incoming secondary air is advantageously directed in the vicinity of the connection to the engine so that it may be preheated and delivered into the reaction space.

A further object of the invention is to provide a device for the after-burning of combustion gases which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawings and descriptive matter in which there is illustrated a preferred embodiment of the invention.

DESCRIPTION OF THE PREFERRED EMBODIMENT

Figure 1:
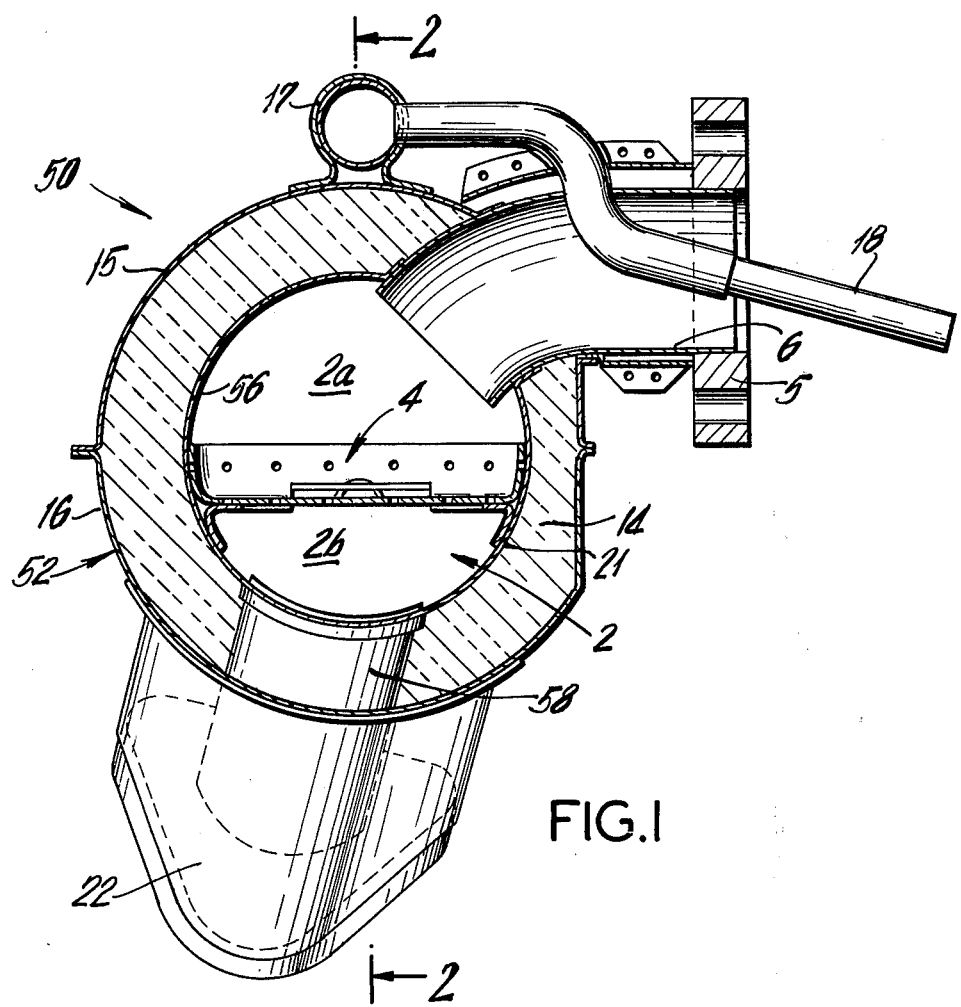
FIG. 1 is a transverse sectional view of an exhaust gas after-burning device constructed in accordance with the invention.

Referring to the drawings in particular, the invention embodied therein, comprises a device, generally designated 50 for the after-burning of combustible components of engine exhaust gases, particularly adapted to be mounted on an engine block of an Otto cycle engine (not shown). The reactor 50 includes a housing 52 having an interior reaction space, generally designated 2, which is divided into an upper reaction chamber portion 2a and a lower reaction chamber portion 2b by an intermediate bottom plate generally designated 4.

In accordance with a feature of the invention, the exhaust gases from the internal combustion engine are delivered to the first reaction chamber 2a through an exhaust gas conduit 6 which has a flange 5 at its one end for mounting it directly on an engine block. In order to enrich the exhaust gases with additional combustion air, the invention provides a separate combustion air conduit 17 which extends along the length of the housing 52 and connects into the first chamber portion 2a. The conduit 17 is designed as an elongated collecting pipe and it is connected through individual branch conduits 18 to a source of secondary combustion air. The branch conduits 18 extend through a portion of the exhaust gas conduit 6 and they ensure that the outlet valves from the engine as well as the exhaust gases are cool while, at the same time, the combustion air is heated.

Figure 3:
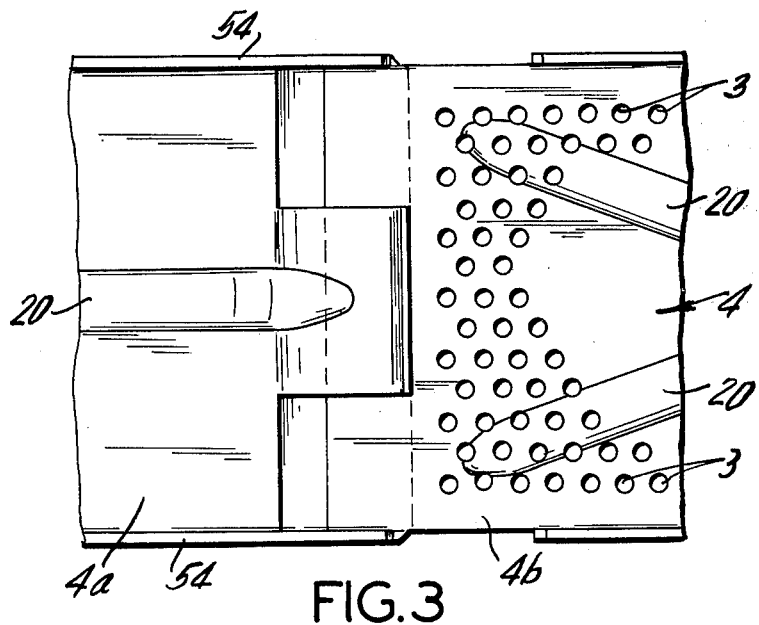
FIG. 3 is a partial top plan view of the bottom wall plate.
Figure 2:
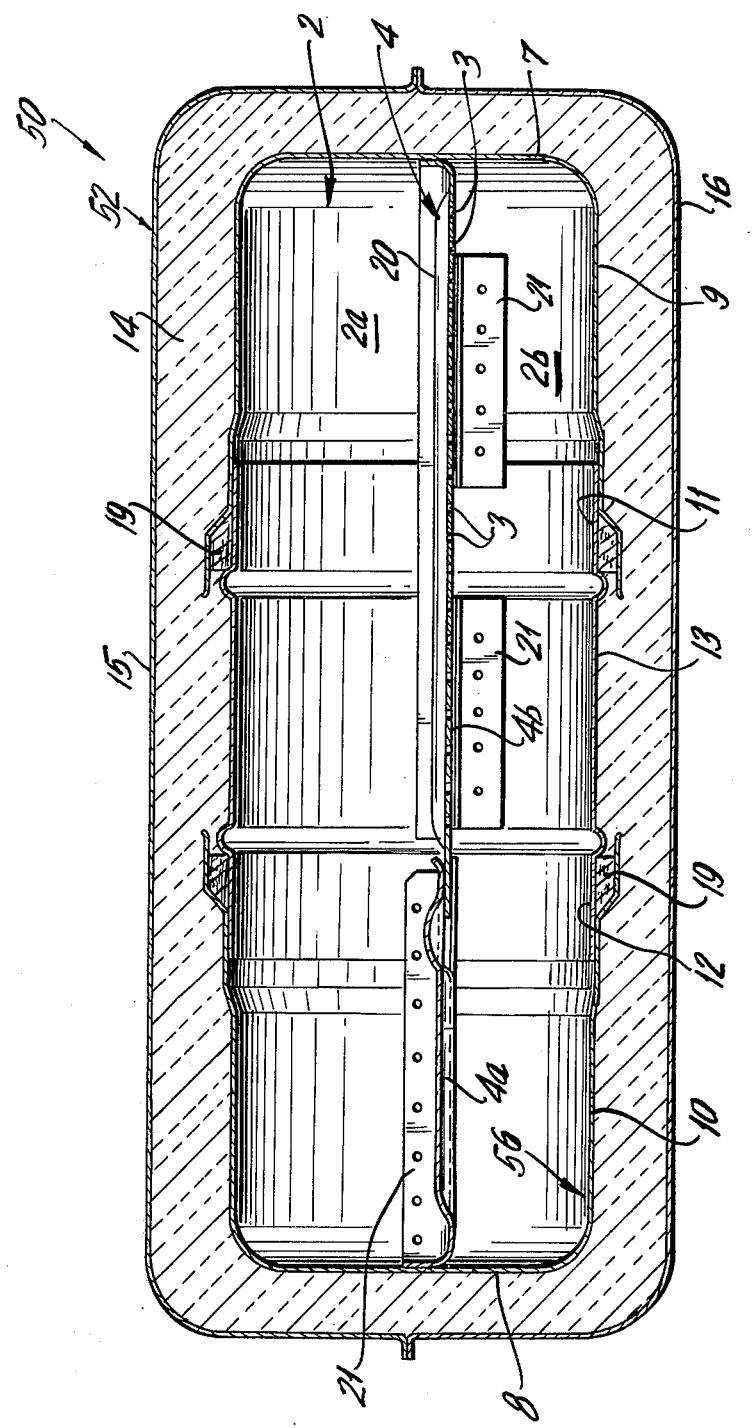
FIG. 2 is a longitudinal sectional view taken along the line 2—2 of FIG. 1.

In accordance with a further feature of the invention, bottom plate 4 is perforated or provided with a plurality of bores 3 which permits the flow of the gases from the first reaction chamber portion 2a to the reaction chamber portion 2b and contributes to the post combustion reaction. Bottom 4, with perforations 3, ensure an extension of the period of dwell of the exhaust gases in each of the chamber portions and they are instrumental in making the flow of these gases and thereby the post combustion much more uniform. The bottom plate 4 is made up of a plurality of longitudinally extending parts and, in the present example, the parts include a part 4a which extends partly over a second part 4b. For this purpose, part 4a includes overlapping edges 54, as shown in FIG. 3, which slidably engage with part 4b. The slidable interengagement permits a compensation for thermal expansion of bottom plate 4 during the occurrence of high temperatures in the reaction zone. In addition, bottom plate 4 is provided with impressions or ribs 20 for increasing its stiffness. Corner supports 21, as shown in FIG. 2, are fixed to the walls of the housing 52 and they support the freely movable bottom plate 4.

In accordance with a further feature of the invention, the housing includes an inner housing wall, generally designated 56, which is made up of three separate parts including a central cylindrical part 13 and end parts 9 and 10. End cylindrical parts 9 and 10 have closures or bottoms 7 and 8, respectively. Central cylindrical part 13 is formed with offset portions 11 and 12 which extend over cylindrical portions 9 and 10 and provide an overlapping sliding interengagement between the parts to permit their movement during thermal stressing.

A treated gas discharge conduit 58 connects into the second reaction chamber portion 2b and is formed as part of a connecting socket 22.

In view of the high temperatures produced in the reaction spaces 2a and 2b during the post combustion, and because reactor 50 is located immediately adjacent an engine block (now shown) which includes fuel conducting pipes, a heat insulation layer 14 is advantageously provided which surrounds the inner wall 56. Housing 52 includes an exterior wall which is made up of two half-shell portions 15 and 16 which are arranged over the insulation 14 and welded together. A foil or seal 19, as shown in FIG. 2, is disposed in the space between connecting wall portions 9, 10 and 13 at the location where these parts overlap in order to prevent the heat insulation material from penetrating between the portions to hinder their longitudinal movement.

The inventive device for after-burning exhaust gases is relatively simple in construction and compact so that it can be easily interchanged and also subsequently mounted on engines which are already in service.

While a specific embodiment of the invention has been shown and described in detail to illustrate the application of the principles of the invention, it will be understood that the invention may be embodied otherwise without departing from such principles.

What is claimed is:

1. A device for the after-burning of combustible components of engine exhaust gases particularly for mounting on an engine block of an Otto cycle engine, comprising a cylindrical reactor housing closed at each end and having an interior elongated reaction chamber, a flat perforated bottom plate extending completely across said reaction chamber and dividing it into first and second reaction chamber portions, said plate being composed of at least two plate parts closing off said first reaction chamber portion from said second reaction chamber and with a marginal edge of one of said plate parts overlapping and slideably engaged on the other, a longitudinally extending support plate connected to each side of the interior of said housing and to each plate, a relatively short exhaust gas conduit having engine block mounting means at one end and connected at its opposite end into said first reaction chamber portion, a treated gas discharge conduit connected into said second reaction chamber portion, and secondary combustion air supply means connected through a portion of said exhaust gas conduit and communication with said first reaction chamber portion to supply air for reacting with the exhaust gases for flow through the perforations of said bottom plate to said reaction chamber portion and out said treated gas discharge conduit.

2. A device according to claim 1, wherein said housing comprises a wall comprising an inner wall portion, an insulating intermediate layer and an outer wall portion, said outer wall portion comprising two interengaged half-shells.

3. A device according to claim 1, wherein said secondary combustion air supply means comprises a collecting conduit extending along the exterior of said housing and a plurality of branch conduits connected into said collecting conduit at least one of said branch conduits extending through said exhaust gas conduit.

4. A device according to claim 1, wherein said housing comprises an inner wall made up of a plurality of interengaged cylindrical portions, each having edges which are in overlapped arrangement, a seal disposed in the space between the overlapped portions of said cylindrical portions, a heat insulation layer surrounding said inner wall and an outer wall covering said heat insulation.

5. A device according to claim 1, wherein said bottom plate has stiffening means thereon.

6. A device according to claim 1, wherein said bottom plate includes a metal layer acting as a catalyst.

7. A device according to claim 1, wherein said bottom plate is made of a copper, nickel or copper-nickel alloy.

8. A device according to claim 1, wherein the overlapped parts have no apertures therethrough.

9. A device according to claim 8, wherein said plate has a stiffening rib, said housing interior wall having means thereon for supporting said bottom plate for movement.

10. A device for the after-burning of combustible components of engine exhaust gases particularly for mounting on an engine block of an Otto cycle engine, comprising a cylindrical reactor housing closed at each end and having an interior elongated reaction chamber, a perforated flat bottom plate extending completely across said reaction chamber and dividing it into first and second reaction chamber portions, said plate being composed of at least two plate parts closing off said first reaction chamber portion from said second reaction chamber and with a marginal edge of one of said plate parts, overlapping and slideably engaged on the other, a longitudinally extending support plate connected to each side of the interior of said housing and to each of said plate parts, a relatively short exhaust gas conduit having engine block mounting means at one end and connected at its opposite end into said first reaction chamber portion, a treated gas discharge conduit connected into said second reaction chamber portion, and secondary combustion air supply means connected into said first reaction chamber portion to supply air for reacting with the exhaust gases and for flow through the perforations of said bottom plate to said second reaction chamber portion and out said treated gas discharge conduit wherein said housing includes a housing wall made up of a plurality of interengageable cylindrical portions with the cylindrical portions of substantially the same diameter, with said cylindrical portions at each end having outer opposite ends each with a closing bottom, said cylindrical portions having adjacent edges overlapped and being relatively movable to permit thermal stress movement.

* * * * *